2,873,169 
Patented Feb. 10, 1959

2,873,169
BASIC PEROXIDE PRECIPITATION METHOD OF SEPARATING PLUTONIUM FROM CONTAMINANTS

Glenn T. Seaborg, Albany, and Isadore Perlman, Berkeley, Calif., assignors to the United States of America as represented by the United States Atomic Energy Commission No Drawing. Application November 26, 1946
Serial No. 712,248

13 Claims. (Cl. 23—14.5)

This invention relates to the separation of fission products from plutonium as they are formed in the production of plutonium from elements of lower atomic weight.

In its more specific aspect it involves the decontamination and concomitant concentration of plutonium, which is element 94 of mass 239, originally obtained as a minor ingredient of uranium of mass 238, as by bombardment of uranium with atomic particles to transform it into uranium of mass 239. The $U^{239}$ with a half life of 23.5 minutes is beta-active and transforms to neptunium of mass 239; and the neptunium is also beta-active with a half-life of 2.33 days and transforms to $Pu^{239}$. Thus a mass of uranium in which plutonium has been built up by bombardment can be allowed to stand or age a week or so and will then predominantly contain plutonium with a minor and steadily dwindling fraction of neptunium. The aging also gets rid of many short-lived and active fission products and reduces the load of contaminants that must be handled by the processing and the extent to which personnel need to be shielded from the material.

In the embodiments of the invention selected for illustration, the material operated on is $Pu^{239}$ derived from natural uranium by bombardment with neutrons of thermal or resonant energies with respect to $U^{238}$.

The invention includes among its objects and advantages the provision of a process for alternately carrying plutonium on carriers of different chemical composition in which the plutonium is separated from the fission products and at the same time progressively concentrated with respect to its various carriers.

Another object is to provide a simple and economical process for separating plutonium with uranium from fission products and then separating the plutonium from the uranium.

Additional objects and advantages of the invention will be evident from the following description.

In general, plutonium is carried from an aqueous solution by means of a first carrier precipitate of a basic peroxidic uranium compound. The carrier and its associated plutonium are then dissolved to form a second aqueous solution, and plutonium is separated from the second solution by means of a second carrier which carries plutonium, leaving in solution the uranium and fission products not previously eliminated. Suitable second carriers are the rare earth fluorides, particularly lanthanum and cerous fluoride, phosphates such as zirconium and bismuth phosphate, and rare earth oxalates.

The conditions for the precipitation of the basic peroxidic uranium compound with plutonium may be varied widely. However, at a pH below about 2.5 the acidity becomes so high that incomplete precipitation of uranium peroxide takes place. Also, in alkaline solution, particularly at a pH of about 8.0 or higher, soluble uranates form, thus preventing the precipitation of uranium as the peroxide. Therefore it is preferable to carry out the precipitation of uranium peroxide carrier in acid solution of a pH above 2.5.

It is also desirable to carry out the uranium peroxide precipitation in the absence of certain ions which form complexes with the uranium, such as sulfate, acetate, and tartrate. These ions not only retard the precipitation of uranium peroxide but may actually prevent it at the lower pH ranges. However, for the second carrier precipitate in which uranium is separated from plutonium the presence of such complexing ions is highly desirable.

The first carrier precipitate of uranium peroxide leaves many of the fission products in solution, including Ba, Sr, Cs, Cb, Te, Ru, Sb, and Mo. Partial precipitates of La, Ce, Y, and Zr in the lower group of fission products occur with the uranium and plutonium.

Neptunium peroxide is more soluble in acid solutions than is plutonium peroxide. At pH 4, using uranium peroxide as carrier, approximately ⅓ of the neptunium precipitates, while at pH 2.8 a substantial amount of plutonium and a negligibly small amount of neptunium come down. Thus the peroxide method may also be used for separating plutonium from neptunium by maintaining the solution at a pH of between about 2 and 3, when carriers are present.

In accordance with one embodiment of this invention uranium is first precipitated as the hydrated peroxide from a dilute solution of the uranyl nitrate derived from neutron-irradiated uranium, the pH of the solution being 2.5–3.5. The plutonium is carried by the uranium peroxide almost quantitatively (greater than 85%), probably as plutonous peroxide. Precipitation may be carried out from very dilute solutions (0.5% to 2.5% uranyl nitrate hexahydrate) using a large excess of $H_2O_2$. About 15 to 20% of the fission activity appears in the uranium peroxide and plutonium peroxide precipitate.

In order to reduce the fission activity brought down with the uranium peroxide and plutonium there may be used a hold-back carrier, such as lanthanum nitrate, soluble compounds of Zr and Ce, or other soluble non-radioactive rare earth compounds. Also reprecipitation of the uranium peroxide and plutonium peroxide may be carried out. Both operations reduce the amount of fission products in the precipitate containing the plutonium and uranium. The addition of a small amount of lanthanum nitrate to the uranyl nitrate and plutonium solution before hydrogen peroxide treatment cuts down by a factor of 2 the amount of beta activity that precipitates with the uranium and the plutonium. A reprecipitation of the uranium peroxide and plutonium reduces the precipitated fission activity by a factor of 2 to 4.

Fission activity precipitating with the uranium peroxide can be reduced by the following modifications: (1) addition of hold-back carriers other than $La^{+++}$ (2) avoiding large excess of $H_2O_2$ (3) reprecipitating the uranium peroxide.

For instance, a ten percent solution of uranyl nitrate containing all of the long-lived fission products and plutonium is treated with a small excess of $H_2O_2$ (40% excess) adjusting the solution to pH 3 to precipitate uranium as uranium peroxide. Before addition of peroxide, small amounts of suitable La, Ce and Zr salts are added as hold-back carriers. The uranium peroxide is centrifuged out and redissolved in a minimum amount of dilute $HNO_3$. The solution is readjusted to pH=3 with $NH_4OH$ and the uranium peroxide again precipitated, hold-back carriers again being added. The uranium peroxide is dried and a small aliquot taken for beta-activity measurement. Only about 1% of the initial beta-emitting fission activity is present in the reprecipitated uranium peroxide. Over 85% of the plutonium will follow uranium through a reprecipitation. If the pH is allowed to drop too low, plutonium will not carry well; while if a base is added too rapidly, local precipitation of uranates will occur, carrying much fission activity.

The recovery of plutonium from the mass of uranium peroxide can be accomplished in various ways. For example the uranium peroxide may be dissolved in alkaline solution through the formation of soluble peroxy-uranates, leaving the insoluble plutonium peroxide. An alternate procedure is to dissolve the uranium peroxide with HF leaving the plutonium behind. The plutonium carried by the uranium peroxide in the peroxide method is present in its reduced or plutonous state in which it is insoluble in the presence of fluoride ion.

The alternate use of different plutonium carriers such as uranium peroxide and lanthanum fluoride also facilitates the concentration of plutonium with respect to its carrier. The ratio of carrier to plutonium may be successively decreased in each cycle of the process. Each carrier may be dissolved in a smaller volume of solution than that required for the preceding carrier; and a solution may finally be obtained from which a plutonium compound may be precipitated without any carrier. Such concentration may be effected simultaneously with decontamination, as in the recovery of plutonium from solutions or precipitates containing uranium fission products. Alternatively, the concentration may be practiced with previously decontaminated solutions or carrier precipitates, or for the recovery of plutonium from dilute waste solutions, or the like.

The successive carriers in the present process differ in cations and in anions. In general, however, the conditions for the precipitation of a subsequent carrier should be such that at least one of the ions of the preceding carrier remains in solution. Since reduction in carrier ratio in successive cycles is difficult in the case of common cations, or common cation elements, it is desirable to employ successive carriers having different cation metals, and we prefer to employ combinations of carriers which differ both in cations and in anions as for example uranium peroxide and lanthanum fluoride.

Although the carriers may be employed as preformed finely divided solids, it is preferable to precipitate the carrier in situ since the latter procedure usually permits a lower carrier ratio and results in more quantitative carrying of plutonium. In general, it is desirable to incorporate the carrier cation in the solution, agitate while adding the carrier anion, and digest the resulting mixture prior to separating the precipitate.

Each precipitate is suitably dissolved in the minimum volume of solution from which the subsequent carrier may be precipitated substantially free from the preceding carrier. The use of different solvents in succeeding stages will facilitate volume reduction, but the same solvent may be used if the concentrations are suitably adjusted. We generally prefer to employ aqueous solvents and to modify their solvent power from stage to stage by adjustment of ionic concentrations. Thus, an aqueous solution of an inorganic acid or base may be used as the solvent in successive stages of our process and the pH may be adjusted to alter the solvent power from stage to stage. An additional ion may be introduced to form a soluble complex with the cation of the preceding carrier. Other equivalent procedures for reducing the volume of solution from stage to stage and for precipitating a carrier free from the preceding carrier will be evident to those skilled in the art.

The ratio of carrier to plutonium in the present process may vary over a wide range depending on the plutonium concentration of the original solution and upon the effectiveness of the particular carrier employed. Ratios ranging from 10,000/1 or higher in the first stage of the process to 10/1 or lower in the final stage may be used. However, the ratio will generally fall within the range 1,000/1 to 100/1.

After one or more carrier precipitations in accordance with the present concentration procedure, a final precipitation may be made with a sufficiently low ratio of carrier to plutonium so that the precipitate may be dissolved in a small volume of solution and a plutonium compound may then be precipitated directly without a carrier. If a carrier isomorphic with plutonium has been employed in the final carrier stage of the process, it will be necessary to change the valence state of the plutonium, or of the carrier cation, in the final solution in order to make a final precipitation of a plutonium compound free from carrier. On the other hand, if the final carrier is non-isomorphic with plutonium it will only be necessary to select conditions for the final precipitation of the plutonium compound such that at least the cation of the carrier remains in solution.

The following are examples of the alternate carrier (uranium peroxide-second carrier) process.

*Example 1*

133 gallons of stock uranyl nitrate solution (60% $UO_2(NO_3)_2 \cdot 6H_2O$) containing plutonium and fission products is run into a 1500-gallon tank and diluted to 1350 gallons. To this solution is added:

10 lbs. lanthanum nitrate
   10 lbs cerium nitrate
   10 lbs zirconium nitrate $H_2O_2$ is then added in a sufficient amount to precipitate all of the uranium. However, acid is liberated in the reaction so that ammonium hydroxide must be added at the same time in sufficient quantity to maintain the pH between 2 and 3. The theoretical amount of 30% $H_2O_2$ necessary to precipitate 1/3 ton of uranium is 300 lbs. or about 115 gal.

The solution is digested for 10–15 minutes at near boiling temperature. The precipitate is allowed to settle for about one hour, after which the supernatant fluid is pumped off. The precipitate is then washed with about 300 gallons of about 1% $H_2O_2$ and again, after settling, the supernatant liquid is pumped off.

The next step is to dissolve and then to reprecipitate the uranium peroxide. This can be done by heating the uranium peroxide precipitate with about 500 gallons of 2 N $HNO_3$; the pH is then adjusted with sodium hydroxide or ammonium hydroxide to pH 3 and hydrogen peroxide and ammonium hydroxide are again added as in the first precipitation. The precipitate is again digested and allowed to settle and the supernatant fluid pumped off. The supernatant fluid from the first peroxide precipitation contains 80–85% of the fission activity and little else. That from the second precipitation contains 15–20% of the total fission activity.

The precipitated uranium peroxide, containing approximately 1% of the fission activity and substantially all of the plutonium can be handled in any of several ways.

One method is to add excess $H_2O_2$, 10–20 lbs. of thorium in the form of a soluble thorium salt, mix well as a slurry, and add enough sodium hydroxide to make the solution approximately 1 N. The uranium peroxide will go into solution as a sodium peruranate, leaving thorium and plutonium peroxides as a precipitate residue. Another method is to dissolve in a minimum of nitric acid, render alkaline (as with sorium hydroxide) and reprecipitate plutonium peroxide, preferably with a carrier of thorium peroxide. In either instance the solution is then centrifuged and the thorium and plutonium peroxides may then be readily separated. The alkaline uranium solution may be pumped into a tank and brought to neutrality, precipitating uranium peroxide. Another method of treating the uranium peroxide carrier precipitate obtained by the first precipitation in this example is to add a considerable amount of rare earth, say 25 lbs., mix well with a slurry of the uranium peroxide and treat with HF. This will dissolve the uranium peroxide, leaving a precipitate residue of rare earth-plutonium fluoride. The recovered uranium compounds may be advantageously subjected to neutrons to produce more plutonium.

Example II

An aqueous solution, about 0.36 N with respect to hydrogen peroxide and about 0.45 N with respect to ammonium ion, was prepared from irradiated uranyl nitrate hexahydrate. The uranium concentration was approximately 47.4 g. per liter (100 g. of uranyl nitrate hexahydrate per liter), and the solution contained $La^{+3}$, $Ba^{+2}$, and $ZrO^{+2}$ as "hold-back carriers" in concentrations of 0.2 g. per liter. The pH of the solution was adjusted to 2.6 by means of ammonium hydroxide, and the resulting uranium peroxide precipitate (probably a basic peroxidic uranium nitrate) was separated from the supernatant solution and washed with dilute aqueous hydrogen peroxide.

The precipitate was then dissolved in concentrated nitric acid, and the resulting solution was partially neutralized with ammonium hydroxide and diluted with water to form a solution having a uranium concentration of 47.4 g. per liter and a pH of 2.6. Hydrogen peroxide was then added to the solution in sufficient amount to form a precipitate. The acidity of the solution was maintained at a pH of about 2.6 by the addition of $NH_4OH$ during the precipitation. The resulting precipitate was separated from the supernatant solution and dissolved in concentrated nitric acid.

The concentrated nitric acid solution was diluted to a nitric acid concentration of about 0.6 N and a uranium concentration of about 50.7 g. per liter. Lanthanum nitrate hexahydrate was then incorporated in the solution in a concentration of about 90 mg. per liter, and excess aqueous hydrofluoric acid was added to precipitate lanthanum fluoride. The precipitate was then separated and washed with dilute aqueous hydrofluoric acid.

The recovery of plutonium through the above three-stage carrier precipitation process was found to be 92 percent of that obtainable in a single stage process employing lanthanum fluoride as the carrier. The decontamination with respect to gamma-active uranium fission products obtained in the three-stage process was determined by measuring the total gamma radiation of various fractions throughout the process. The distribution of the gamma radiation was found to be as follows:

| Fraction: | Percent of total gamma radiation |
|---|---|
| Original solution | 100.0 |
| First supernatant solution | 44.5 |
| Second supernatant solution | 8.5 |
| Final supernatant solution | 40.0 |
| Final precipitate | 7.0 |
| Total | 100.0 |

The above results illustrate the efficiency of decontamination by the alternate use of carriers of different chemical compositions compared with repeated use of the same carrier.

This application is a continuation in part of our co-pending application, Serial Number 474,062, filed, January 30, 1943, now U. S. Letters Patent No. 2,052,336, issued September 16, 1958.

Others may readily adapt the invention for use under various conditions by employing one or more of the novel features disclosed or equivalents thereof. As at present advised, with respect to the apparent scope of the invention, we desire to claim the following subject matter.

What is claimed is:

1. A process of separating uranyl values, plutonium values of a maximum valence of +4 and fission product values contained in an aqueous solution from each other, comprising adjusting the pH value of said aqueous solution to between 2.5 and 8; adding hydrogen peroxide to said solution whereby uranium peroxide precipitates and said plutonium values are carried on said uranium peroxide while said fission produce values preferentially remain in solution; separating said uranium peroxide precipitate from said solution; dissolving said precipitate in an aqueous solution of an inorganic acid; incorporating a second carrier into said acid solution, said second carrier having an anion that forms a water-insoluble salt with plutonium but a water-soluble salt with uranium, whereby plutonium is selectively precipitated; and separating said plutonium-containing precipitate from said solution.

2. A process of separating uranyl values, plutonium values of a maximum valence state of +4 and fission product values contained in an aqueous solution from each other, comprising adjusting the pH value of said aqueous solution to between 2.5 and 8; adding hydrogen peroxide to said solution whereby uranium peroxide precipitates and said plutonium values are carried on said uranium peroxide while said fission product values preferentially remain in solution; separating said uranium peroxide precipitate from said solution; dissolving said precipitate in an aqueous solution of an inorganic acid; incorporating a second carrier into said acid solution, said second carrier being selected from the group consisting of rare earth fluorides, rare earth oxalates, zirconium phosphate and bismuth phosphate, whereby plutonium is selectively precipitated; and separating said plutonium-containing precipitate from said solution.

3. The process of claim 2 wherein the pH is maintained at said range of between 2.5 and 8 during the precipitation of uranium peroxide.

4. The process of claim 2 wherein the uranium peroxide precipitate is dissolved in nitric acid.

5. The process of claim 2 wherein the uranium peroxide precipitate is dissolved in nitric acid and a second precipitation with hydrogen peroxide is carried out prior to dissolution and incorporation of the second carrier.

6. The process of claim 2 wherein the pH range is between 2.5 and 3.5.

7. The process of claim 6 wherein the pH value is about 3.

8. The process of claim 2 wherein water-soluble salt of nonradioactive rare earth metal is added to the solution before precipitation of the uranium peroxide.

9. The process of claim 8 wherein said rare earth salt is a mixture of lanthanum, cerium and zirconium nitrates.

10. The process of claim 8 wherein said rare earth salt is a mixture of lanthanum, barium and zirconyl nitrates.

11. The process of claim 2 wherein said second carrier is lanthanum fluoride.

12. The process of claim 11 wherein said lanthanum fluoride carrier is formed in situ by first adding lanthanum nitrate and then hydrofluoric acid.

13. The process of claim 12 wherein the nitric acid concentration of the solution is adjusted to 0.6 N prior to the addition of lanthanum nitrate.

References Cited in the file of this patent

UNITED STATES PATENTS 2,785,951     Thompson et al.     Mar. 19, 1957

OTHER REFERENCES

Fairley: Journal of the Chemical Society, vol. 31, pp. 127–133 (1877).

Seaborg: Chemical and Engineering News, vol. 23, No. 23, pp. 2190–2193 (1945).